(12) United States Patent
Querejeta Andueza et al.

(10) Patent No.: US 9,285,053 B2
(45) Date of Patent: Mar. 15, 2016

(54) GAS VALVE AND ASSEMBLY METHOD FOR A GAS VALVE

(71) Applicant: COPRECITEC, S. L., Aretxabaleta (ES)

(72) Inventors: Félix Querejeta Andueza, Hendaye (FR); Jose Ignacio Mugica Odriozola, Bergara (ES)

(73) Assignee: COPRECITEC, S. L., Aretxabaleta (ES)

( * ) Notice: Subject to any disclaimer, the term of this patent is extended or adjusted under 35 U.S.C. 154(b) by 41 days.

(21) Appl. No.: 14/375,792

(22) PCT Filed: Feb. 27, 2013

(86) PCT No.: PCT/EP2013/053912
§ 371 (c)(1),
(2) Date: Jul. 30, 2014

(87) PCT Pub. No.: WO2013/127838
PCT Pub. Date: Sep. 6, 2013

(65) Prior Publication Data
US 2014/0374635 A1    Dec. 25, 2014

(30) Foreign Application Priority Data
Feb. 28, 2012  (EP) .................................... 12382069

(51) Int. Cl.
*F16K 31/06* (2006.01)
*F23N 1/00* (2006.01)
(52) U.S. Cl.
CPC ............ *F16K 31/0655* (2013.01); *F23N 1/002* (2013.01); *F23N 1/00* (2013.01); *F23N 2035/14* (2013.01); *F23N 2035/24* (2013.01); *F23N 2900/05004* (2013.01)

(58) Field of Classification Search
CPC ....... F16K 31/0655; F23N 1/002; F23N 1/00; F23N 2035/14; F23N 2900/05004; F23N 2035/24
USPC ........................... 251/129.15–129.16, 129.22
See application file for complete search history.

(56) References Cited

U.S. PATENT DOCUMENTS 2,607,368 A * 8/1952 Mayer ................ F16K 31/0651
251/129.21
4,067,541 A * 1/1978 Hunter .................. H01F 7/1607
251/129.15

(Continued)

FOREIGN PATENT DOCUMENTS

DE        102005035613 B3    8/2006
EP              1382907 A1    1/2004

(Continued)

OTHER PUBLICATIONS

European Extended Search Report dated Jul. 27, 2012, performed by the European Patent Office for European application No. 12382069, pp. 1-6, The Hague, Netherlands.

*Primary Examiner* — John Bastianelli
(74) *Attorney, Agent, or Firm* — Edell, Shapiro & Finnan, LLC

(57) ABSTRACT

A gas valve having a valve body that at least partially defines a gas enclosure. The valve body has an intake, an outlet and a hole for communicating the outlet with the intake. A valve seat within the gas enclosure cooperates with the hole to permit or to prevent the passage of gas through the hole. An electrically activated actuator, when activated, is configured to move or keep the valve seat in the open position. The gas valve includes connection means that connect the actuator to the outside of the gas valve, the connection means being disposed at least in part on a metal core printed circuit board. The printed circuit board is soldered to a metal structure located within the gas enclosure to at least partially seal the gas enclosure, the metal structure supporting, at least in part, the electrical actuator.

15 Claims, 5 Drawing Sheets

(56) References Cited

U.S. PATENT DOCUMENTS

| | | | | |
|---|---|---|---|---|
| 4,102,526 A | * | 7/1978 | Hargraves | F16K 31/0606 251/129.21 |
| 4,441,687 A | * | 4/1984 | Pauliukonis | F16K 31/0651 251/129.21 |
| 4,459,819 A | * | 7/1984 | Hargraves | F25B 41/062 251/129.08 |
| 4,469,304 A | * | 9/1984 | Kah, Jr. | F16K 31/082 251/129.04 |
| 4,851,800 A | * | 7/1989 | Peterson | H01F 7/14 335/229 |
| 4,898,360 A | * | 2/1990 | VonHayn | B60T 8/3675 251/129.15 |
| 5,048,564 A | * | 9/1991 | Gaiardo | F16K 27/003 251/129.16 |
| 5,199,456 A | | 4/1993 | Love et al. | |
| 5,318,071 A | * | 6/1994 | Gaiardo | F16K 31/0682 137/625.65 |
| 5,449,227 A | * | 9/1995 | Steinberg | B60T 8/3675 251/129.15 |
| 5,481,237 A | * | 1/1996 | Sarfati | F16K 31/06 137/554 |
| 5,845,672 A | * | 12/1998 | Reuter | B60T 8/3675 251/129.15 |
| 5,992,461 A | * | 11/1999 | Gilmore | H01F 7/081 137/625.65 |
| 6,145,806 A | | 11/2000 | Dettmann | |
| 6,164,323 A | * | 12/2000 | Smith | F15B 13/0817 137/554 |
| 6,412,754 B1 | * | 7/2002 | Ogino | B60T 8/3675 251/129.15 |
| 6,572,251 B1 | * | 6/2003 | Huang | B60Q 1/326 362/464 |
| 6,750,521 B1 | * | 6/2004 | Chilcott | B81B 7/007 257/414 |
| 6,786,238 B2 | * | 9/2004 | Frisch | F16K 31/0682 137/625.44 |
| 7,011,113 B2 | * | 3/2006 | Gandrud | F16K 27/003 137/884 |
| 7,377,290 B2 | * | 5/2008 | Albert | F16F 9/461 137/375 |
| 2001/0048244 A1 | * | 12/2001 | Altenrenger | H01F 7/08 303/119.1 |
| 2003/0183791 A1 | * | 10/2003 | Meinhof | F16K 31/126 251/129.04 |
| 2008/0074219 A1 | * | 3/2008 | Hazzard | H01F 7/128 335/278 |
| 2008/0121832 A1 | * | 5/2008 | Rosenbauer | A47L 15/46 251/129.15 |
| 2009/0114865 A1 | * | 5/2009 | Homann | B60T 8/3675 251/129.15 |
| 2010/0038571 A1 | | 2/2010 | Frank et al. | |

FOREIGN PATENT DOCUMENTS

| | | |
|---|---|---|
| EP | 1640664 A2 | 3/2006 |
| WO | WO9857081 A1 | 12/1998 |
| WO | WO2008034525 A1 | 3/2008 |

* cited by examiner

GAS VALVE AND ASSEMBLY METHOD FOR A GAS VALVE

CROSS-REFERENCE TO RELATED APPLICATIONS

This application is a US national phase filing of International Application No. PCT/EP2013/053912, filed Feb. 27, 2013, which relates to and claims the benefit of and priority to European Application No. EP12382069, filed Feb. 28, 2012.

TECHNICAL FIELD

The invention relates to gas valves that need an external power supply, and to assembly methods for gas valves.

BACKGROUND

The use of gas valves to control the passage of gas that reaches a burner (or another device of this type) is widely known. With a gas valve the passage of gas may be allowed or prevented: to prevent it the gas valve is closed completely, and to allow it the gas valve is opened. These type of valves are known as ON/OFF-type valves, although other types of gas valves are known, namely regulation valves, which may regulate the flow of gas when its passage is permitted, so that the passage of gas may be opened to a greater or lesser extent, enabling the passage of a larger or smaller flow of gas as required.

The valves comprise a gas intake through which they receive the gas originating from a gas source, for example, a gas outlet through which the flow of gas exits in a regulated manner towards the required destination, such as a burner, a through hole that connects the intake to the outlet, and a valve seat or head that cooperates with the through hole when it is actuated to allow and prevent the passage of gas.

The valve seat may be actuated in a mechanical or electrical manner. When it is actuated in a mechanical manner a force is exerted on it in order to move it to the corresponding position, and on many occasions, an electrical unit, generally magnetic, is required to then keep it in said position, which requires an electrical supply in order to keep acting on the valve seat.

When it is actuated in an electrical manner it is activated by an electrical unit, generally magnetic, which requires an electrical supply in order to keep acting on the valve seat. Similarly, in order to keep it in the required position, an additional electrical or magnetic unit may be used as the power requirements are inferior to those required to move the valve seat, in which case the electrical or magnetic unit also requires an electrical supply.

Generally the supply to the electrical or magnetic units comes from outside the valve, both when the valve seat is actuated in a mechanical manner and when it is actuated in an electrical manner. Said valve must thus comprise an outward connection through which the electrical or magnetic units may be supplied from the outside, while the sealed nature of the inside of the valve must also be maintained.

EP1640664A2 discloses a control valve assembly including an inlet for receiving a gas flow and an outlet for providing the gas flow to a gas burner. The assembly also includes a positive-shutoff valve for interrupting the gas flow from the inlet. A micro electromechanical system valve (MEMS) is coupled in series to the positive-shutoff valve between the inlet and the outlet for regulating the gas flow from the inlet to the outlet.

WO98/57081A1 discloses a miniaturized magnetic valve suitable for integration into an electric or electronic circuit by mounting on a printed circuit board.

WO2008/034525A1 discloses a valve control unit for a pressure modulator of a commercial vehicle. The unit comprises solenoid valves provided with solenoids which are fixed to a printed circuit board.

Document EP1382907A1 discloses a valve that comprises an electrical or magnetic unit and connections that extend outwards to supply the electrical or magnetic unit.

SUMMARY OF THE DISCLOSURE

The gas valve comprises a gas enclosure with an intake, an outlet and a through hole to communicate the outlet with the intake, and a valve member that comprises a valve seat that cooperates with the through hole to allow or prevent the passage of gas through the through hole. The valve also comprises actuation means that acts on the valve member at least in order to keep the valve seat in a required position, and connection means to supply the actuation means from the outside of the valve.

The valve also comprises a metal core printed circuit board to which the valve member is soldered and which comprises, at least partially, the connection means. The valve member comprises a metal structure that is formed by a material that can be soldered, which is fixed to the printed circuit board, which defines an inner housing where the actuation means are disposed, and which comprises at least one window through which the connection means are connected to the actuation means.

The valve can thus be electrically supplied from the outside in a simple and easy manner, a sealed closure of the valve also being provided. As a result, the valve can be supplied with power from the outside while maintaining the necessary sealing integrity in the gas enclosure in a simple manner, as it is the printed circuit board itself which provides the sealing integrity. Furthermore, as the structure is soldered to the printed circuit board, the valve can be assembled in a simple manner with automated soldering processes, for example.

It is another object of the invention to provide an assembly method for a gas valve comprising a valve member with a valve seat to prevent or allow the passage of gas through it, and actuation means that are adapted to keep the valve seat in an open position in which the passage of gas is allowed and which are supplied from the outside of the valve, as described in the claims.

In the method the actuation means are housed in the valve member, the valve member is disposed with the actuation means on a metal core printed circuit board, and the valve member is soldered to the printed circuit board. As a result, the gas valve can be assembled in a simple manner.

These and other advantages and characteristics will be made evident in the light of the drawings and the detailed description thereof.

DETAILED DESCRIPTION

Figure 1:
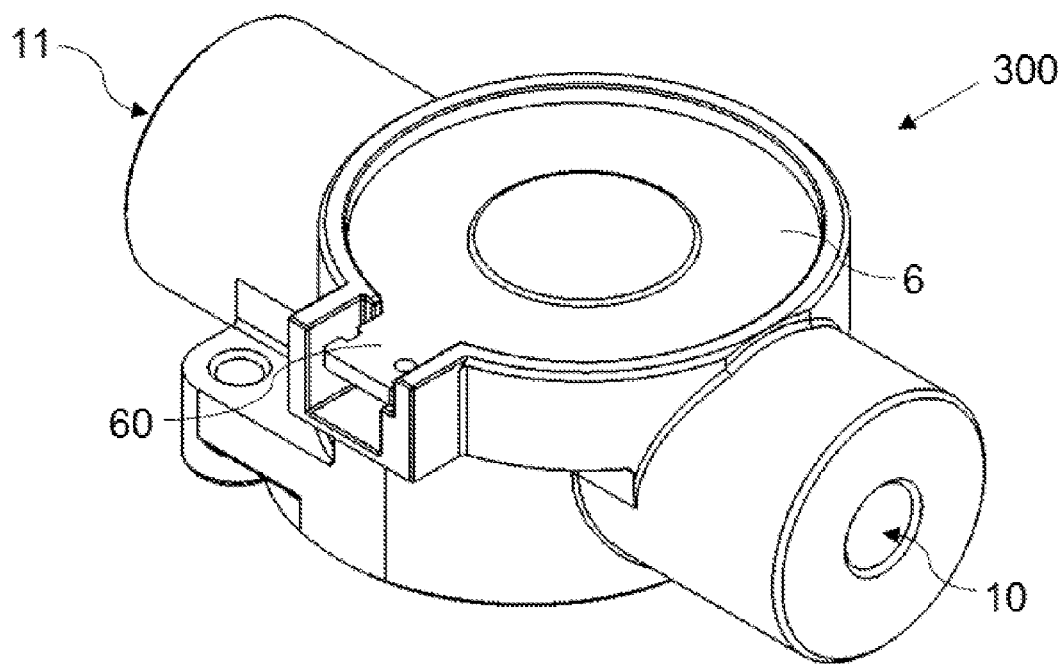
FIG. 1 is a perspective view of a valve according to one embodiment.
Figure 2:
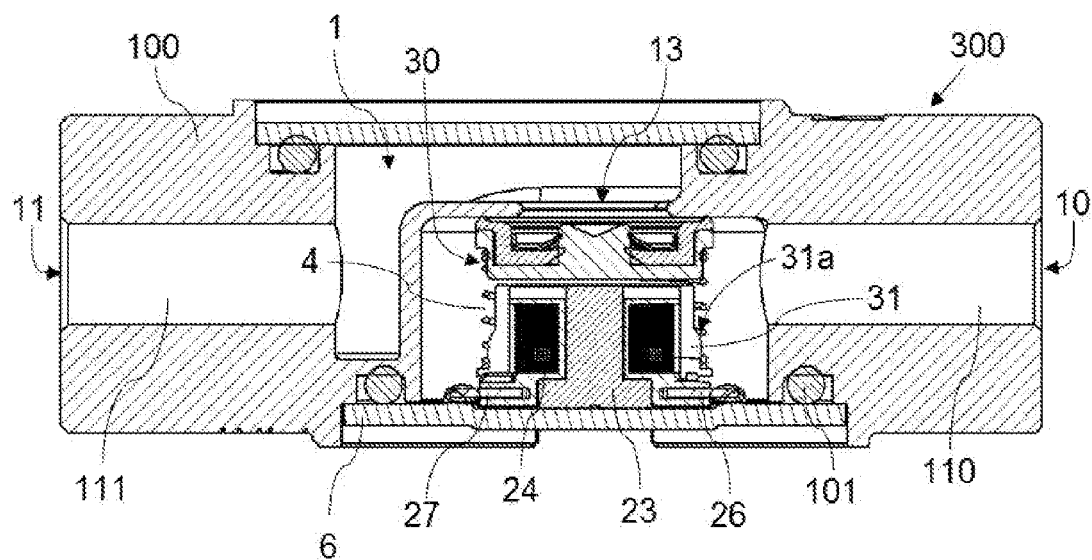
FIG. 2 is a cross-sectional view of the valve of FIG. 1, with a through hole of the valve closed.
Figure 3:
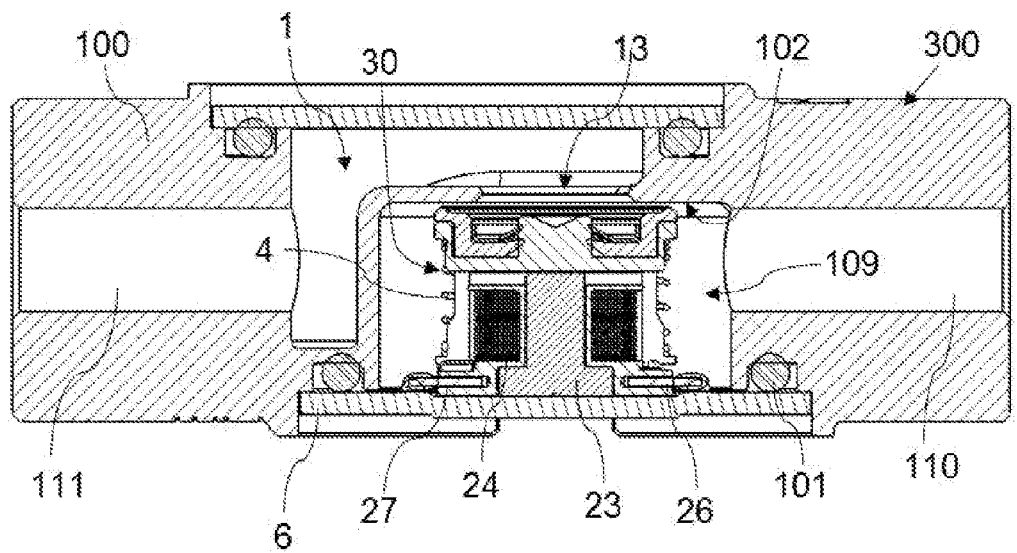
FIG. 3 is a cross-sectional view of the valve of FIG. 1, with the through hole of the valve open.

A first aspect relates to a gas valve 300, which is of the ON/OFF type. FIGS. 1 and 2 show an embodiment of the valve 300, which comprises a gas enclosure 1 with an intake 10 for the gas, an outlet 11 for said gas, and a through hole 13 to communicate the outlet 11 with the intake 10. The valve 300 also comprises a valve member, preferably in the gas enclosure 1, comprising a valve seat or head 30 that cooperates with the through hole 13 to prevent or allow the flow of gas that reaches the outlet 11. The valve seat 30 can thus comprise two positions: a closed position shown in FIG. 2, in which it does not allow the passage of gas through the through hole 13, and an open position shown in FIG. 3, in which it allows the passage of a certain flow of gas through the through hole 13.

The valve 300 comprises a valve body 100 that comprises the gas enclosure 1, the intake 10 and the outlet 11, and the valve member and the actuation means are disposed in the gas enclosure 1. Preferably the gas enclosure 1 comprises a chamber 109 where the valve member and, at least partially, the actuation means are disposed, an intake pipe 110 that communicates the intake 10 with the chamber 109, and an outlet pipe 111 that communicates the chamber 109 with the outlet 11, the through hole 13 being possible to be corresponded with the start of the outlet pipe 111.

The valve 300 comprises actuation means that acts on the valve member at least in order to keep the valve seat 30 in the required position, and connection means to supply the actuation means from the outside of the valve 300. In a rest situation, where the valve 300 is not operating with no power being supplied to the valve, the through hole 13 is closed to prevent the passage of gas through it for safety reasons, so that the required position corresponds in this case with the open position. To provide the closure the valve 300 comprises closure means, preferably a spring 4, which will be described later and which exert a pressure on the valve seat 30 towards the through hole 13.

The valve 300 comprises a metal printed circuit board 6, also know in the art as a metal core printed circuit board (MCPCB), to which the valve member is fixed and which comprises, at least partially, the connection means, and the valve member comprises a metal structure 31 that is fixed to the printed circuit board 6 preferably by means of soldering, which defines an inner housing where the actuation means is disposed at least partially, and which comprises at least one window 33 through which the connection means are connected to the actuation means. The material of the structure 31, in the case of being soldered to the printed circuit board 6, corresponds with a solderable material, such as nickel-plated steel, and the printed circuit board 6 comprises, at least in the areas to be soldered with structure 31, a material which is solderable such as tin (normally in the form of a track or pad).

As a result, the actuation means can be supplied from the outside in a simple manner, the necessary sealing integrity in the gas enclosure 1 being maintained, as the printed circuit board 6 itself provides the sealing integrity. Furthermore, as the structure 31 is soldered to the printed circuit board 6, the valve 300 can be assembled in a simple manner with automated soldering processes for example. The valve body 100 can comprise a housing to house a seal 101 or an equivalent member to provide a sealed closure between the printed circuit board 6 and the valve body 100. In this case, in order to close the through hole 13, the valve member 30 cooperates with the valve body 100 as shown in FIG. 2.

Figure 4:
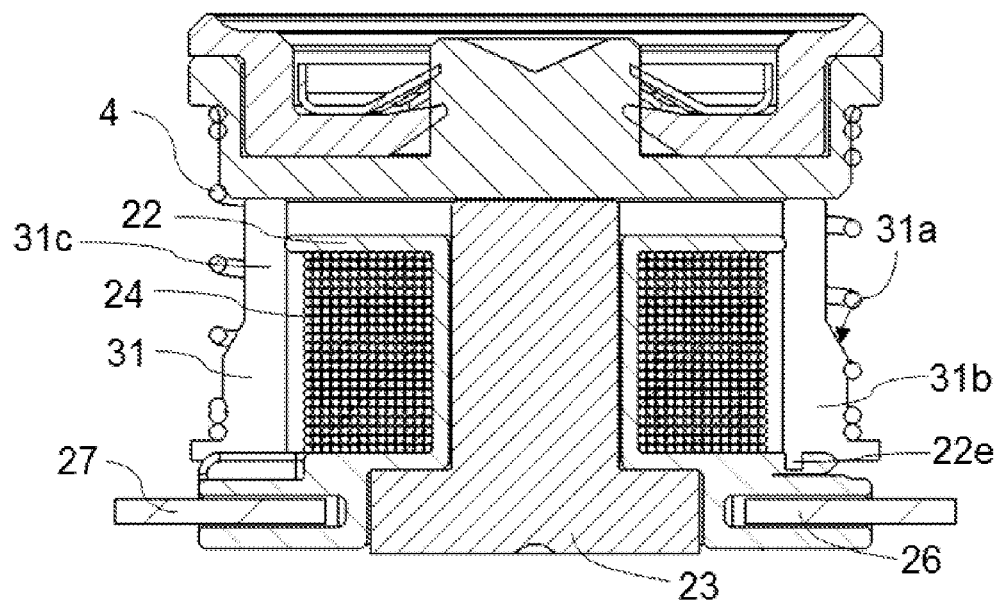
FIG. 4 shows actuation means of the valve of FIG. 1.

With reference to FIG. 4, the actuation means comprise a magnetic core 23 disposed in the inner housing that defines the structure 31, preferably a steel frame, at least one coil 24 disposed in said inner housing, a first terminal 26 that is fixed to one end of the coil 24 and which passes through the window 33, and a second terminal 27 that is fixed to the opposite end of the coil 24 which passes through the window 33, so that the supply reaches the coil 24 through the terminals 26 and 27, the actuation means thus being supplied. When the valve 300 is supplied, due to the current that passes through the coil 24 a magnetic field is generated that produces an opposing force to the spring 4, and when said force is greater than the force generated by the spring 4 the valve seat 30 is attracted from the closed position to the open position, the passage of gas being opened through the through hole 13. The current necessary to keep the passage of gas open is smaller than the current necessary to open it, as a result of which, in one embodiment the valve 300 may comprise two coils, one to open the passage and another to keep it open. In another embodiment the passage of gas may be opened mechanically, so that the coil is only in charge of keeping the passage open. The valve seat 30 is disposed on the structure 31, which enables it to be attracted by the force produced by the magnetic field and/or kept in the open position.

Figure 5:
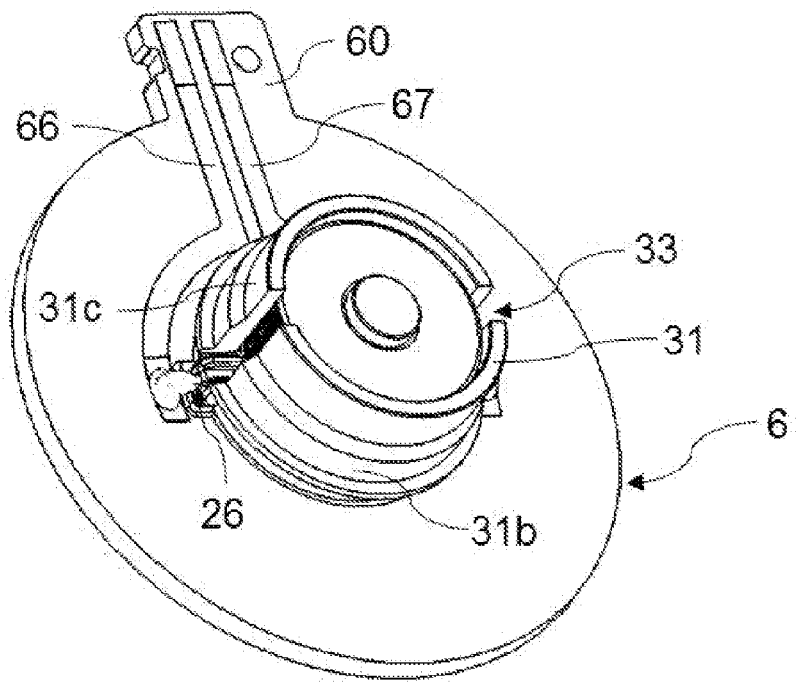
FIG. 5 shows a structure of a valve member of the valve of FIG. 1, disposed on a printed circuit board of the valve.

The connection means comprise at least one conduction path 66 and 67 on the printed circuit board 6 for each terminal 26 and 27, as shown by way of example in FIG. 5. Each terminal 26 and 27 is fixed by means of soldering to the corresponding conduction path 66 and 67 on the outside of the structure 31. The printed circuit board 6 comprises a connection zone 60 that is adapted to support a connection with a connector or an equivalent member for example, through which the valve is connected to an external supply source. The conduction paths 66 and 67 extend from the connection zone 60 to at least the point of connection with the terminals 26 and 27, so that the supply reaches the terminals 26 and 27 originating from an external supply source by means of the connection zone 60 and the conduction paths 66 and 67, the coil 24 and therefore the actuation means thereby being supplied. The structure 31 preferably comprises a window 33 for each terminal 26 and 27, one window 33 being disposed at 180° in relation to the other window 33. In addition, preferably, each window 33 extends along the entire axial length of the structure 31, as shown in FIG. 5.

Figure 6:
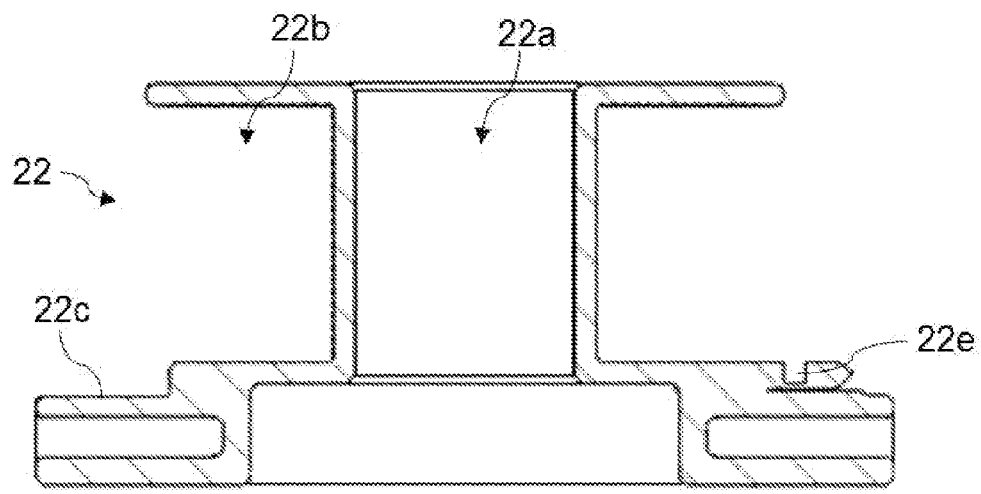
FIG. 6 shows a cross-sectional of an intermediate part of the actuation means of the valve of FIG. 1 according to one embodiment.

The structure 31 comprises a substantially cylindrical shape and the actuation means comprise a intermediate ring-shaped part 22 shown in FIG. 6, which is disposed in the inner housing of the structure 31, which comprises a central through hole 22a that is passed through at least partially by the core 23, and which comprises a substantially "C" shape defining a ring-shaped housing 22b along with the structure 31 where the coil 24 wound in relation to the central hole 22a is disposed. The inner housing is thus delimited by the structure 31 itself, the printed circuit board 6 and the valve seat 30 when it is in the open position. The material of the intermediate part 22 is a material that does not conduct electricity, such as a type of elastomer, for example, although it preferably corresponds with a high heat-resistant plastic, which also withstands high temperatures such as those generated in a soldering process for example. As a result, although the valve 300 is introduced into a soldering oven for example so that the requisite solderings may be carried out, the intermediate part does not deform or melt, for example.

Figure 7:
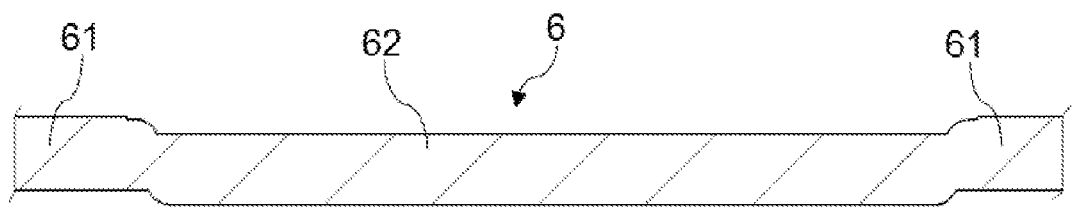
FIG. 7 shows a cross-section of the printed circuit board of the valve of FIG. 1.

The intermediate part 22 preferably comprises a ring-shaped extension 22c that covers and holds the part of the terminals 26 and 27 that is disposed in the inner housing of the structure 31, although it can also comprise an extension 22c for each terminal 26 and 27. The extension 22c (or the extensions 22c, as the case may be) are disposed between the ring-shaped housing 22b of the intermediate part 22 and the printed circuit board 6, and, as shown by way of example in FIG. 7, the printed circuit board 6 comprises a first zone 61 where the terminals 26 and 27 are soldered, and a second zone 62 where the structure 31 of the valve member is soldered, the second zone 62 corresponding with a depression of the printed circuit board 6. According to one embodiment, the terminals 26 and 27 extend substantially parallel to the printed circuit board 6, and due to the extension 22c (or extensions 22c), if there were no depression in the printed circuit board 6, the terminals 26 and 27 would become distanced from the soldering surface of the printed circuit board 6 and an additional action would be necessary in order to bring them closer or do what is required to enable the soldering. Thanks to the depression the terminals 26 and 27 remain in contact or very close to the soldering surface of the printed circuit board 6, preventing the need for additional actions for correct soldering, resulting in a simplification of the assembly or fitting process of the valve and a reduction in the cost of said assembly or fitting. The second zone 62 preferably comprises a substantially circular shape, with a depth that allows the correct soldering of the terminals 26 and 27 without having to perform additional actions, as commented.

The intermediate part 22 also comprises a channel, not shown in the Figures, on the part of the extension 22c that covers a terminal 26, in order to guide the end of the coil 24 that is connected to the corresponding terminal 26 towards the inner housing of the structure 31 from said terminal 26, and a groove 22e on the part of the extension 22c that covers the other terminal 27, in order to guide the end of the coil 24 that is connected to said terminal 27 towards said terminal 27 from the inner housing of the structure 31.

As commented above, the closure means preferably comprises a spring 4. The spring 4 is coiled on the valve seat 30 and on the structure 31, and in the absence of supply of the actuation means, the force it exerts causes the valve seating 30 to become separated from the actuation means and close the through hole 13, preventing the passage of gas through it. As a result, this situation corresponds with a rest position of the spring 4. When, due to the supply, the force generated by the actuation means exceeds that of the spring 4, the spring 4 is compressed and as a result the valve seat 30 moves closer to the actuation means opening the through hole 13, thereby allowing the passage of gas through it. As a result, this situation corresponds with a position of compression of the spring 4. With the spring 4 in the compression position, if the supply to the actuation means is stopped they stop generating the force that keeps the spring 4 in that position, and the spring 4 returns to its rest position.

The structure 31 may comprise a ring-shaped projection 31a, on which at least part of a turn of the spring 4 is supported. The projection 31a divides the structure 31 into a first zone 31b with a diameter substantially equal to the diameter of the valve seat 30 and a second zone 31c with a smaller diameter, the second zone 31c being between the first zone 31b and the valve seat 30. Thanks to this division, and in particular to the projection 31a, when the spring 4 changes position its turns are prevented from being disposed between the valve seat 30 and the actuation means, which may result in, for example, the valve 300 not operating correctly, the blocking of the valve 300, or even the breakage of the valve 300.

Figure 8:
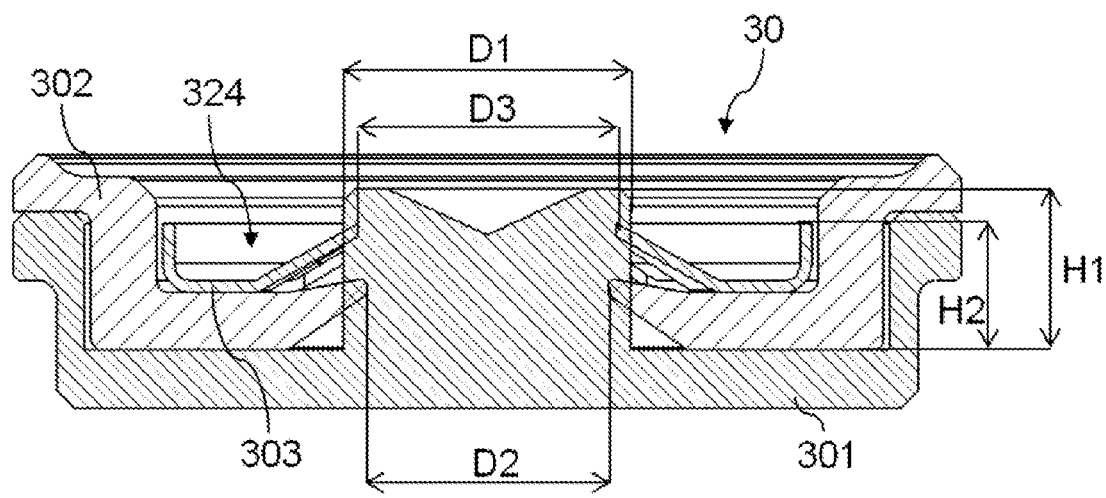
FIG. 8 shows a cross-sectional view of a valve seat of the valve of FIG. 1 according to one embodiment.

With reference to FIG. 8, where an embodiment of the valve seat 30 is shown, the valve seat 30 can comprise at least three different members, that are joined and move as a single body in the direction of closing the through hole 13 or in the direction of opening it: a first part 301 of a ferromagnetic material, a second part 302 of an elastomer material such as silicon, viton, NBR or HNBR, for example, and a third part 303 that preferably corresponds with a steel spring washer.

When the coil 24 is supplied with a current, a magnetic field is generated that has as its function the generating of a force to attract the valve seating 30 towards it or to keep it in said attracted position (open position). To enable the attraction or the maintaining of it, the valve seat 30 comprises a ferromagnetic material that, due to electromagnetism properties, is attracted by the force generated by the magnetic field. As a result, in this embodiment the part of the valve seat 30 on which the attraction force is exerted is the first part 301, and as the second part 302 and the third part 303 are joined to the first part 301, said parts 302 and 303 are also attracted, thereby the valve seat 30 being attracted. As a result, the passage of gas through the through hole 13 is opened.

When the valve seat 30 is in the closed position, in the embodiment of the valve seat 30 illustrated in the figures the part in charge of closing the through hole 13 is the second part 302, which presses against a surface 102 of the valve body 100 that surrounds the through hole 13. The valve body 100 is preferably metallic, so that the second part 302 is made of elastomer material in order to cause a sealed closure of the through hole 13 and prevent in a safe manner the passage of gas through it.

In the embodiment of the valve seat 30 illustrated in the figures, the main function of the third part 303 of the valve seat 30 is to keep the second part 302 joined to the first part 301, and to thereby prevent, when the first part 301 is attracted or maintained in its position by the force generated by the magnetic field, the second part 302 to be released from the first part 301, which would result in the through hole 13 not being opened or not being opened in the required manner, or even in the event that it was open, it could happen that it is not closed correctly when required.

Figure 9:
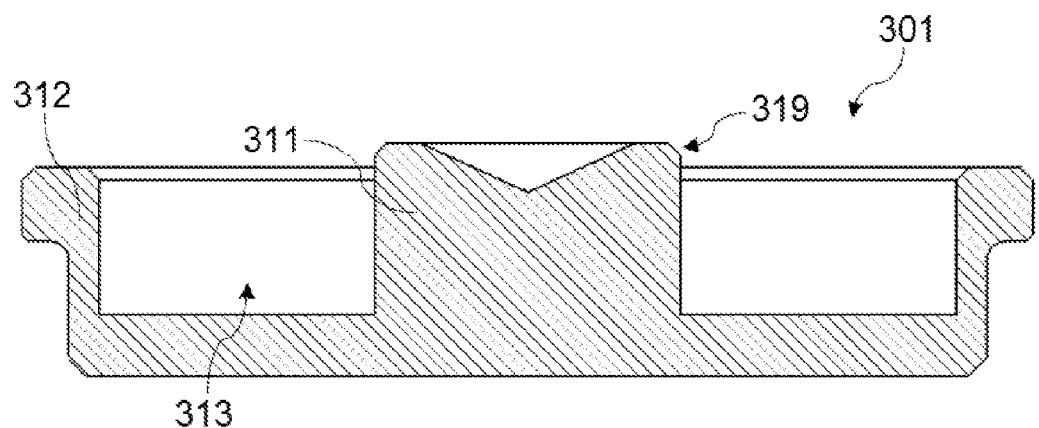
FIG. 9 shows a cross-sectional view of a first part of the valve seat of FIG. 8.

Preferably, in the embodiment of the valve seating 30 illustrated in the figures the valve seat 30 comprises a circular or cylindrical shape. The three parts 301, 302 and 303 which make up the valve seat would thus have the same shape. The first part 301 comprises a central column 311 and a circular outer column 312 that extends along its perimeter, a ring-shaped housing 313 being defined between the columns 311 and 312. Thus, in a cross-section such as the one shown in FIG. 9 for example, the first part 301 comprises a substantially inverted "M" shape. In other embodiments it may not include the outer column 312.

Figure 10:
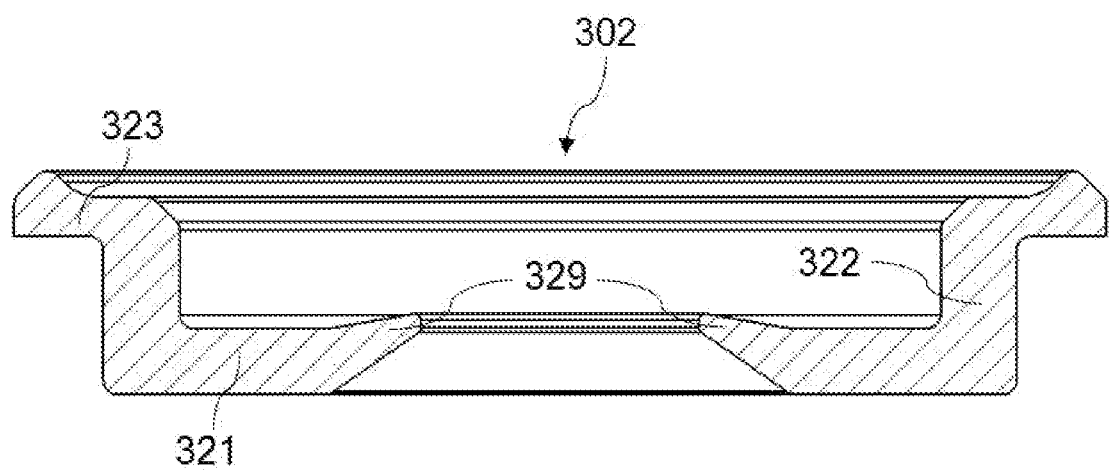
FIG. 10 shows a cross-sectional view of a second part of the valve seat of FIG. 8.

The second part 302, shown by way of example in FIG. 10, is disposed in the ring-shaped housing 313 defined between the columns 311 and 312 of the first part 301, and comprises a central hole that is passed through by the central column 311 of the first part 301. The first part 301 can comprise a first groove in the outer surface of the central column 311 to house one end of the second part 302, both parts 301 and 302 thus being joined to each other, although the diameter D1 of the central column 311 of the first part 301 is preferably greater than the diameter D2 of the central hole of the second part 302, so that the second part 302 withstands stretching when it is disposed in the ring-shaped housing 313, it thus being connected to the first part 301 while guaranteeing sealing integrity in the closure between the first part 301 and the second part 302. Preferably the diameter D2 of the central hole of the second part 302 is between approximately 10% and approximately 20% smaller than the diameter D1 of the central column 311 of the first part 301. For example, the diameter D2 may be 16% smaller than the diameter D1, the diameter D1 being equal to 4.2 millimeters and the diameter D1 equal to 5 millimeters. In addition, in order to enable its disposal on the first part 301 and/or its stretching the second part 302 can comprise a sloping zone 329 adjacent to its central hole.

The second part 302 covers the surface of the first part 301 on which it is disposed, so that this ensures that the part of the valve seat 30 that comes into contact with the surface 102 of the valve body 100 that surrounds the through hole 13 is the second part 302 and in no circumstances the first part 301. The second part 302 thus preferably comprises a first zone 321 that is substantially horizontal and adjacent to its central hole and which covers the zone of the first part 301 disposed between the columns 311 and 312, a second zone 322 that is a substantially vertical wall and covers the surface of the outer column 312 of the first zone 301 that is facing the central column 311 of the first part 301, and a third zone 323 that is substantially horizontal and covers the outer surface of the outer column 312. The length of the central column 311 of the first part 301 is such that the second zone 322 of the second part 302 faces it, a ring-shaped housing 324 being defined between them. If the first part 301 does not comprise the outer column 312, the second part 302 may not comprise the zones 322 and 323, a ring-shaped housing 324 not being defined additionally.

Figure 11:
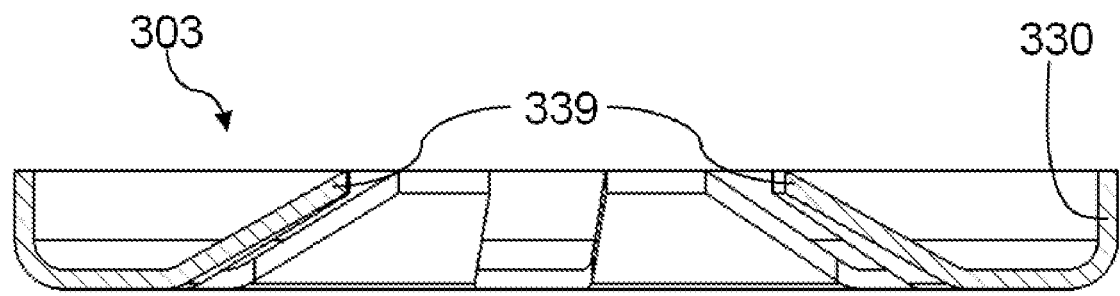
FIG. 11 shows a cross-sectional view of a third part of the valve seat of FIG. 8.

The third part 303, shown by way of example in FIG. 11, is disposed in the ring-shaped housing 324 defined between the central column 311 of the first part 301 and the second zone 322 of the second part 302, and comprises a central hole that is passed through by the central column 311 of the first part 301. The first part 301 can comprise a groove in the outer surface of the central column 311 in order to house one end of the third part 303, both parts 301 and 303 thus being connected together, although the diameter D1 of the central column 311 of the first part 301 is preferably greater than the diameter D3 of the central hole of the third part 303, so that the third part 303 withstands an elastic deformation when it is disposed in the ring-shaped housing 324, and exerts a pressure on the central column 311 of the first part 301. The third part 303 is thus firmly joined to the first part 301 and prevents the second part 302 from coming away. Preferably, the diameter D3 of the central hole of the third part 303 is between approximately 5% and approximately 15% smaller than the diameter D1 of the central column 311 of the first part 301. For example, the diameter D3 may be 10% smaller than the diameter D1, the diameter D3 being equal to 4.5 millimeters and the diameter D1 equal to 5 millimeters. In addition, in order to enable its disposal on the second part 302 and/or its deformation the third part 303 can comprise a sloping zone 339 adjacent to its central hole.

In addition, the third part 303 presses on the second part 302 making it even more difficult for the second part 302 to come away from the first part 301. The third part 303 can also comprise a substantially vertical outer wall 330, on the end opposite the end that is in contact with the central column 311 of the first part 301. Preferably, the third zone 323 of the second part 302 is at a height greater than the outer wall 330 of the third part 303 and the central column 311 of the first part 301, thereby ensuring the contact of said second part 302 with the surface 102 of the valve body 100 that surrounds the through hole 13. If, with the second part 302, a ring-shaped housing 324 is not defined, the third part 303 can be disposed on top of the second part 302, in which case it would not comprise the outer wall 330 or preferably the second part 302 would comprise a housing, not shown in the Figures, where the third part 303 would be disposed.

In order to enable the insertion of the parts 302 and 303 and therefore the assembly of the valve seat 30, the central column 311 of the first part 301 comprises an end 319 in the form of a bevel, said end 319 corresponding with the free end of the first part 301. In addition, the height H1 of the central column 311 is greater than the height H2 formed by the parts 302 and 303 when they are disposed in the ring-shaped housing 313 and 324 respectively, so that the correct fixing of both parts 302 and 303 in said position is ensured.

The assembly of the valve seat 30 is explained below. Firstly, the second part 302 is disposed in the ring-shaped housing 313 defined in the first part 301, exerting a pressure on it. The third part 303 is then disposed in the ring-shaped housing 324 defined between the central column 311 of the first part 301 and the second zone 322 of the second part 302, exerting a pressure on it. Once assembled, the valve seat 30 is disposed in the required part of the valve 300.

The use of the aforementioned valve seat 30 is not restricted to a valve 300 as illustrated in the figures, it being capable of also being disposed in any other electromagnetic valve, preferably a gas valve.

A second aspect relates to an assembly method for a gas valve 300 that comprises a valve member with a valve seat to prevent or allow the passage of gas through it and actuation means that are adapted to keep the valve seat in an open position in which it allows the passage of gas and which are supplied from the outside of the valve. In the method the actuation means, preferably comprising at least one coil and a core, are assembled, the actuation means is housed in the valve member, the valve member with the actuation means is disposed on a metal printed circuit board, and the valve member is soldered to the printed circuit board.

The method may also be used to assemble a valve 300 such as the one described in the first aspect, in any of its embodiments and/or configurations.

The invention claimed is:

1. A gas valve comprising:
   a valve body having a gas enclosure, a gas inlet, a gas outlet and a through hole situated in the gas enclosure between the gas inlet and outlet to provide a gas flow path between the gas inlet and outlet,
   a valve seat situated adjacent the through hole and moveable with respect to the through hole, in a first position the valve seat is situated to close the through hole to close the gas flow path between the gas inlet and outlet, in a second position the valve seat is situated away from the through hole to open the gas flow path between the gas inlet and outlet,
   an electrically powered actuator configured to act upon the valve seat to move it from the first position to the second position when electrical power is supplied to the actuator, the actuator including a magnetic core, a first terminal electrically coupled with the coil, and a second terminal electrically coupled with the coil, a metal structure disposed within the gas enclosure having a housing in which the electrically powered actuator is at least partially disposed; and a metal core printed circuit board soldered to the metal structure to at least partially seal the gas enclosure, the metal core printed circuit board used to deliver electrical power to the actuator from outside the valve body, the metal core printed circuit board having a first conduction path electrically connected to the first terminal and a second conduction path electrically connected to the second terminal, the metal core printed circuit board having a first zone and a second zone, the second zone at least partially surrounded by the first zone, the first and second terminals being soldered to the metal core printed circuit board in the first zone, the metal core printed circuit board being soldered to the metal structure in the second zone.

2. A gas valve according to claim 1, wherein the metal structure comprises one or more windows through which the first and second terminals are connected to the actuator.

3. A gas valve according to claim 2, wherein the metal structure comprises a first window through which the first terminal is connected to the actuator, and a second window through which the second terminal is connected to the actuator, the first and second windows being disposed at 180° in relation to each other.

4. A gas valve comprising:
a valve body having a gas enclosure, a gas inlet, a gas outlet and a through hole situated in the gas enclosure between the gas inlet and outlet to provide a gas flow path between the gas inlet and outlet,
a valve seat situated adjacent the through hole and moveable with respect to the through hole, in a first position the valve seat is situated to close the through hole to close the gas flow path between the gas inlet and outlet, in a second position the valve seat is situated away from the through hole to open the gas flow path between the gas inlet and outlet,
an electrically powered actuator configured to act upon the valve seat to move it from the first position to the second position when electrical power is supplied to the actuator,
a metal structure disposed within the gas enclosure having a housing in which the electrically powered actuator is at least partially disposed; and
a metal core printed circuit board soldered to the metal structure to at least partially seal the gas enclosure, the metal core printed circuit board having one or more conduction paths used to deliver electrical power to the actuator from outside the valve body,
the metal structure comprising one or more windows through which the one or more conduction paths are connected to the actuator,
the actuator comprising a magnetic core and at least one coil, a first terminal that is fixed to a first end of the coil, and a second terminal that is fixed to a second end of the coil, the metal core printed circuit board having a first conduction path electrically connected to the first terminal and a second conduction path electrically connected to the second terminal the actuator comprising an intermediate part that is disposed in the housing of the metal structure, the intermediate part having a central through hole that is passed through at least partially by the core, the intermediate part having a housing wherein the at least one coil is disposed wound in relation to the central hole.

5. A gas valve according to claim 4, wherein the intermediate part comprises at a first end a radial extension that covers and holds at least a part of the first and second terminals.

6. A gas valve according to claim 5, wherein the radial extension is disposed between the housing of the intermediate part and the metal core printed circuit board.

7. A gas valve according to claim 4, wherein the intermediate part comprises a first radial extension that covers and holds at least a part of the first terminal, and a second radial extension that covers and holds at least a part of the second terminal.

8. A gas valve according to claim 7, wherein the first and second radial extensions are disposed between the housing of the intermediate part and the metal core printed circuit board.

9. A gas valve according to claim 7, wherein the intermediate part comprises a first channel that passes through at least a portion of the first extension, the first channel used to receive the first end of the coil that is electrically coupled to the first terminal, and a second channel that passes through at least a portion of the second extension, the second channel used to receive the second end of the coil that is electrically coupled to the second terminal.

10. A gas valve according to claim 4, wherein the intermediate part is a material that does not conduct electricity and withstands high temperatures generated during a soldering process.

11. A gas valve comprising:
a valve body having a gas enclosure, a gas inlet, a gas outlet and a through hole situated in the gas enclosure between the gas inlet and outlet to provide a gas flow path between the gas inlet and outlet,
a valve seat situated adjacent the through hole and moveable with respect to the through hole, in a first position the valve seat is situated to close the through hole to close the gas flow path between the gas inlet and outlet, in a second position the valve seat is situated away from the through hole to open the gas flow path between the gas inlet and outlet,
an electrically powered actuator configured to act upon the valve seat to move it from the first position to the second position when electrical power is supplied to the actuator,
a metal structure disposed within the gas enclosure having a housing in which the electrically powered actuator is at least partially disposed; and
a metal core printed circuit board soldered to the metal structure to at least partially seal the gas enclosure, the metal core printed circuit board having one or more conduction paths used to deliver electrical power to the actuator from outside the valve body,
the metal structure comprising one or more windows through which the one or more conduction paths are connected to the actuator,
the actuator comprising a magnetic core and at least one coil, a first terminal that is fixed to a first end of the coil, and a second terminal that is fixed to a second end of the coil, the metal core printed circuit board having a first conduction path electrically connected to the first terminal and a second conduction path electrically connected to the second terminal,
the metal core printed circuit board comprising a first zone where the first and second terminals are fixed and a second zone located within a depression of the metal core printed circuit board where the metal core printed circuit board is soldered to the metal structure.

12. A gas valve according to claim 11, wherein each of the first and second terminals extend substantially parallel to the metal core printed circuit board, the depth of the depression is such that a part of each of the first and second terminals is disposed on the first zone of the metal core printed circuit board at a distance in relation to the second zone which permits a soldering of the first and second terminals to the metal core printed circuit board.

13. A gas valve comprising:
a valve body having a gas enclosure, a gas inlet, a gas outlet and a through hole situated in the gas enclosure between the gas inlet and outlet to provide a gas flow path between the gas inlet and outlet,
a valve seat situated adjacent the through hole and moveable with respect to the through hole, in a first position the valve seat is situated to close the through hole to close the gas flow path between the gas inlet and outlet, in a second position the valve seat is situated away from the through hole to open the gas flow path between the gas inlet and outlet,
an electrically powered actuator configured to act upon the valve seat to move it from the first position to the second position when electrical power is supplied to the actuator,
a metal structure disposed within the gas enclosure having a housing in which the electrically powered actuator is at least partially disposed;
a metal core printed circuit board soldered to the metal structure to at least partially seal the gas enclosure, the metal core printed circuit board having one or more conduction paths used to deliver electrical power to the actuator from outside the valve body; and a spring that is configured to continuously urge the valve seat toward the first position, the spring being coiled on the valve seat and on the metal structure.

14. A gas valve according to claim 13, wherein the metal structure comprises a projection along its perimeter on which at least part of a turn of the spring is supported.

15. A gas valve according to claim 14, wherein the valve seating has a first diameter and the projection divides the metal structure into a first zone with a second diameter substantially equal to the first diameter, and a second zone with a third diameter less than the second diameter, the second zone being between the first zone and the valve seat.

* * * * *